Oct. 30, 1962 J. B. RATELBAND 3,060,966
VALVES OF THE DIAPHRAGM TYPE
Filed March 18, 1960 2 Sheets-Sheet 1

Inventor:
Johannes B. Ratelband

Oct. 30, 1962  J. B. RATELBAND  3,060,966
VALVES OF THE DIAPHRAGM TYPE
Filed March 18, 1960  2 Sheets-Sheet 2

INVENTOR
Johannes B. Ratelband
BY
Ernest G. Montague
ATTORNEY 3,060,966
Patented Oct. 30, 1962

3,060,966
VALVES OF THE DIAPHRAGM TYPE
Johannes B. Ratelband, Velp, Netherlands, assignor to N.V. Inter-Ocean, Willemstad, Curacao, Netherlands Antilles, a company of the Netherlands
Filed Mar. 18, 1960, Ser. No. 16,077
Claims priority, application Netherlands Mar. 24, 1959
4 Claims. (Cl. 137—601)

The present invention relates to a valve of the diaphragm type, in which the sleeve-shaped diaphragm consists of elastic material and is united with a core member which is also elastic, said diaphragm opening in its opened condition a passage area, for fluid outside said core member.

It is one object of the present invention to provide a valve of this kind in which the active part of the diaphragm may be made very elastic, so that the diaphragm may be pressed by a small force against the core member to check the flow of liquid or gas passing the valve.

It is another object of the present invention to provide a diaphragm which is connected to the hollow core member by means of longitudinal ribs. Since in this valve the sleeve-shaped diaphragm is supported by the connecting ribs extending substantially along the entire axial length of said diaphragm and, as these ribs may be made rigid, the diaphragm itself may be made thin so that it is easily deformable. It is also possible to use a simple cylindrical casing consisting of one part only, as the diaphragm permits its compression when it is inserted into the casing from one end thereof. If desired, the hollow core member may be provided with a filling after the insertion of the diaphragm.

With these and other objects in view which will become apparent in the following detailed description, the present invention will be clearly understood in connection with the accompanying drawings, in which.

Figure 1:
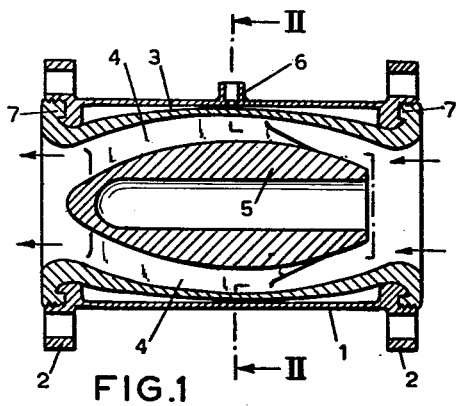
FIGURE 1 is a longitudinal sectional view of a valve having a casing consisting of one single part only.
Figure 2:
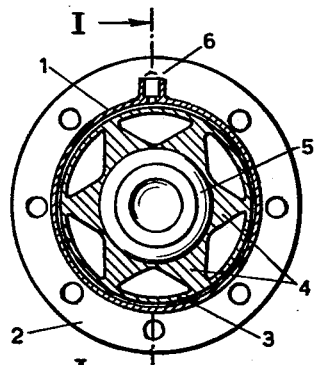
FIG. 2 is a section along the lines II—II of FIG. 1.

Referring now to the drawings, and in particular to the embodiment disclosed in FIGS. 1 and 2, the casing comprises a simple cylindric tubular part 1 to which connecting flanges 2 are attached.

The sleeve-shaped diaphragm 3 is united with a core member 5 by means of longitudinal ribs 4. The core member 5 is hollow and its cavity is open towards the inflow side of the casing.

The casing 1 is provided with a nipple 6 for the supply of a pressure fluid into the part of the casing surrounding the diaphragm 3, said fluid allowing the diaphragm to be pressed against the core member 5.

The diaphragm 3 is provided at both ends with a collar 7 which engages a correspondingly formed groove in the inner faces of the flanges 2 of the casing.

Figure 3:
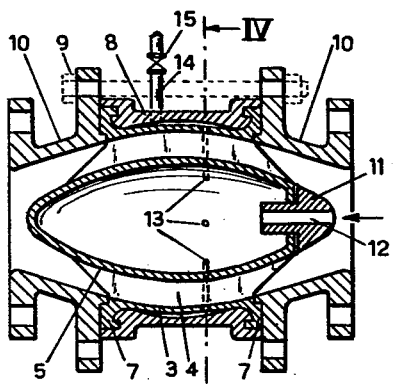
FIG. 3 is a longitudinal sectional view of a second embodiment of a valve having a casing consisting of an intermediate portion and two end portions attached thereto.
Figure 4:
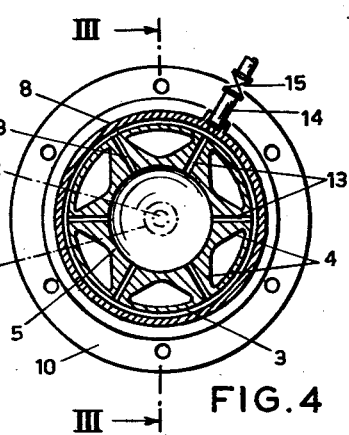
FIG. 4 is a section along the lines IV—IV of FIG. 3.

Referring now to the embodiment illustrated in FIGS. 3 and 4, the diaphragm 3 is substantially shorter than the core member 5 and engages with its collars 7 grooves of the intermediate portion 8 of the casing. The two end portions 10 of the casing are attached to the intermediate portion 8 by means of bolts 9. The core member 5 is provided, on the inflow side of the casing, with a head 11 having a passage 12.

In the ribs 4 there are provided radially extending passages 13 which interconnect the cavity of the core member 5 and the outer side of the diaphragm 3. Owing to the provision of the passage 12 the pressure on the inflow side of the casing will also be present in the hollow core member 5 and this pressure will be obtained on the outer side of the diaphragm 3, as soon as the regulating valve 15 in the conduit 14 is closed as the fluid can not flow out of the space at the outer side of the diaphragm. As the total passage area of the channels formed between the longitudinal ribs 4 is smaller than the passage area at the in flow side of the casing part of the pressure energy of the liquid is converted into kinetic energy so that the pressure in said channels will be lower than the pressure at the outerside of the diaphragm and consequently the latter will be pressed against the core member, so that the valve will close itself. When the regulating valve 15 is adjusted in an intermediate position fluid will escape from the space at the outer side of the diaphragm 3, so that the pressure in said space will be reduced and the diaphragm will adjust itself in a condition of equilibrium, so that the passage cross area of the valve can be adjusted by means of said regulating valve 15.

Figure 5:
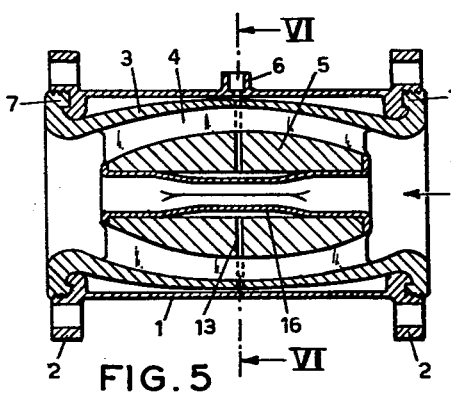
FIG. 5 is a longitudinal sectional view of a third embodiment of the valve.
Figure 6:
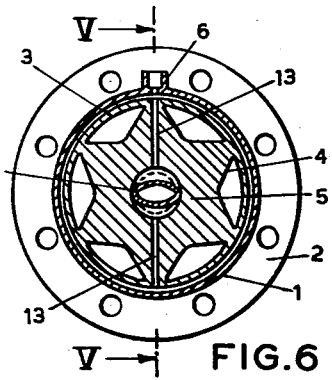
FIG. 6 is a section along the line VI—VI of FIG. 5.

Referring now to the embodiment shown in FIGS. 5 and 6 which substantially corresponds with the embodiment disclosed in FIGS. 1 and 2, the cavity of the core member 5 is open at both ends and an elastic tube 16 is provided in said cavity. Also in this case the cavity of the core member 5 is connected by one or more passages 13 with the outer side of the diaphragm 3. The pressure fluid supplied at 6 to the valve will now flow also into the cavity of the core member 5 outside the tube 16, so that when the valve is closed the tube 16 will also be gradually closed. Owing thereto the flow of the fluid will be gradually interrupted, so that blows in the fluid circuit are prevented.

As in the valve according to the present invention the passage between the core member and the diaphragm is divided into several sub-passages by the ribs 4, it is also possible to construct the valve such, as to permit said sub-passages to be separately closed by means of mechanically moved pressure members or bellows.

Figure 7:
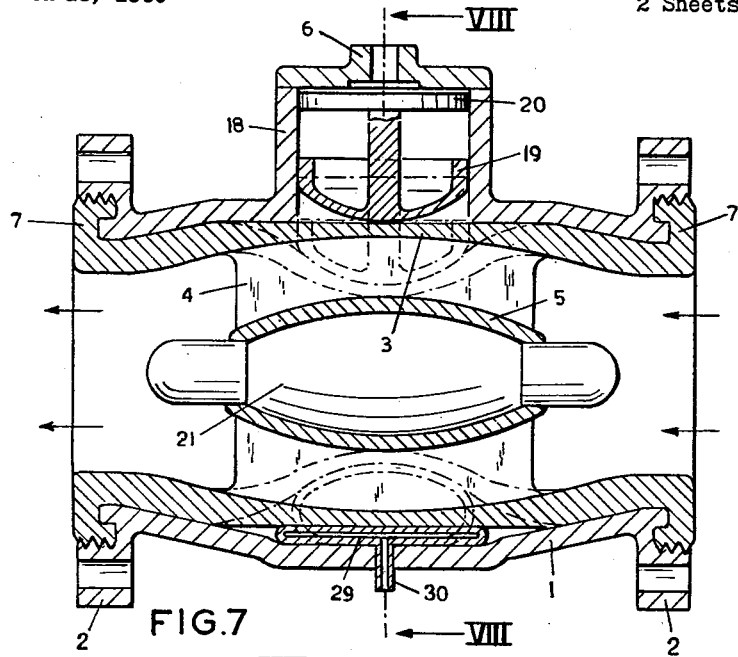
FIG. 7 is a longitudinal section of a fourth embodiment of the valve.
Figure 8:
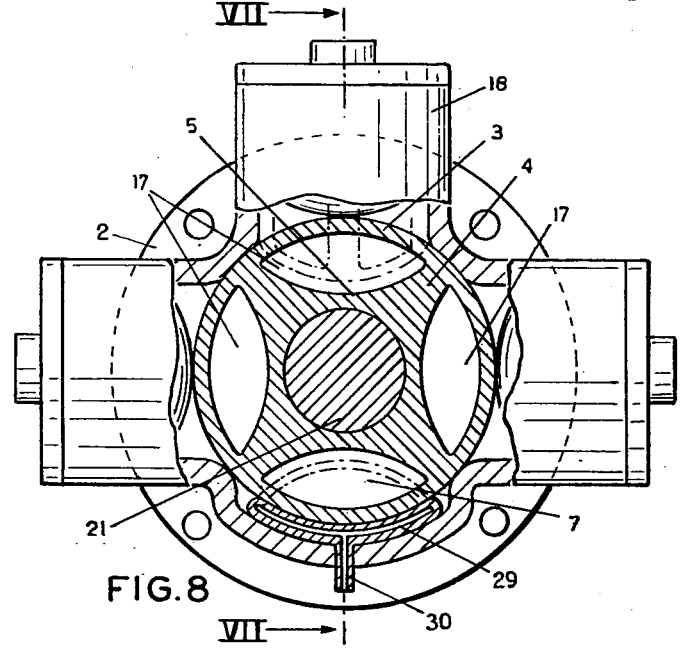
FIG. 8 is a section along the lines VIII—VIII of FIG. 7.

Such an embodiment is disclosed in FIGS. 7 and 8 of the drawings. The flow passage around the core member is divided in four passages 17 by the longitudinal ribs 4 and each of the passages may be closed separately of the other passages. To this end the casing is provided with three cylindrical projections 18 each containing a plunger 19 united with a piston 20 on which pressure fluid may be supplied through nipple 6 for forcing the diaphragm onto the core member 5, as shown in dash and dot lines in the drawing.

The lowermost passage 17 may be closed by means of a bellows 29 into which pressure fluid may be introduced through the nipple 30 for inflating the bellows, which in its inflated condition forces the diaphragm 3 onto the core member 5.

As shown in FIGS. 7 and 8 the cavity of the core member 5 is filled by a solid body 21.

The diaphragm and the core member may be made as a unit in a matrix from rubber or elastic synthetic material. Both members may also be made separately and thereafter be connected to one another.

Finally it may be stated, that in the valve constructed in accordance to the invention the diaphragm may make the passage cross-area outside the core member at least as large as the cross-area of the inflow opening of the casing without making it necessary that a casing composed of three portions, as shown in FIG. 3 is used.

I claim:

1. A valve comprising, in combination, a housing, a sleeve-shaped diaphragm of elastic material mounted in said housing, a hollow core member of elastic material disposed axially within said diaphragm, and of an axial length different from that of said diaphragm, a plurality of radially disposed longitudinal ribs interconnecting said diaphragm and said core member and extending along substantially the entire length of said diaphragm, said diaphragm and said core member defining therebetween an annular passage divided by said radially disposed longitudinal ribs into axially extending sections to avoid eddies, and means exerting pressure upon the outer face of said diaphragm.

2. The valve, as set forth in claim 1, which includes a removable filling in the cavity of said hollow core member.

3. The valve, as set forth in claim 1, wherein at least one passage extends radially in at least one of said longitudinal ribs and opens with its one end in the cavity of said core member and with its other end in the circumferential surface of said diaphragm, a discharge passage provided in the wall of said housing which faces said diaphragm and a valve provided in said passage, the cavity of said core member being open towards the fluid inflow side of said housing.

4. The valve, as set forth in claim 1, wherein at least one passage extends radially in at least one of said longitudinal ribs and opens with its one end into the cavity of said core member and with its other end in the circumferential surface of said diaphragm, said cavity being open both towards the fluid inflow side and towards the fluid outflow side of said housing, and a tubular member of elastic material inserted in said cavity and adapted to be closed by local compression.

References Cited in the file of this patent

UNITED STATES PATENTS

| | | |
|---|---|---|
| 1,837,138 | Mitchell | Aug. 23, 1932 |
| 2,360,873 | Grove | Oct. 24, 1944 |
| 2,573,712 | Kallam | Nov. 6, 1951 |
| 2,633,154 | Eastman | Mar. 31, 1953 |
| 2,687,145 | Carter | Aug. 24, 1954 |
| 2,795,390 | Lavrenty | June 11, 1957 |
| 2,898,078 | Stephenson | Aug. 4, 1959 |
| 2,907,346 | Fortune | Oct. 6, 1959 |

FOREIGN PATENTS

| | | |
|---|---|---|
| 502,094 | Great Britain | Mar. 10, 1939 |